United States Patent
Leutert et al.

(10) Patent No.: US 11,484,975 B2
(45) Date of Patent: Nov. 1, 2022

(54) METHOD AND DEVICE FOR MOUNTING A PLUG IN A HOLLOW SHAFT

(71) Applicant: Mahle International GmbH, Stuttgart (DE)

(72) Inventors: Markus Leutert, Fichtenberg (DE); Arthur Mello, Fellbach (DE); Alexander Varga, Balingen (DE)

(73) Assignee: Mahle International GmbH

( * ) Notice: Subject to any disclaimer, the term of this patent is extended or adjusted under 35 U.S.C. 154(b) by 0 days.

(21) Appl. No.: 17/504,484

(22) Filed: Oct. 18, 2021

(65) Prior Publication Data

US 2022/0118564 A1 Apr. 21, 2022

(30) Foreign Application Priority Data

Oct. 19, 2020 (DE) .................... 102020213148.1

(51) Int. Cl.
- *B23P 19/10* (2006.01)
- *B23P 19/02* (2006.01)
- *F16C 3/02* (2006.01)

(52) U.S. Cl.
CPC ............. *B23P 19/022* (2013.01); *B23P 19/10* (2013.01); *F16C 3/023* (2013.01); *B23P 2700/07* (2013.01)

(58) Field of Classification Search
CPC ..... B23P 19/022; B23P 19/10; B23P 2700/07; F16C 3/023
See application file for complete search history.

(56) References Cited

U.S. PATENT DOCUMENTS 6,243,621 B1 * 6/2001 Tao .................. B25J 9/1694
700/86
9,309,953 B2 4/2016 Menonna

FOREIGN PATENT DOCUMENTS

| DE | 19531832 C2 | 7/1998 |
| DE | 102007056638 A1 | 5/2009 |
| DE | 102008064194 A1 | 7/2010 |
| DE | 102009060350 A1 | 6/2011 |
| DE | 102011106981 A1 | 1/2013 |
| EP | 2777868 A1 | 9/2014 |

OTHER PUBLICATIONS

English abstract for DE-19531832.
English abstract for DE-102007056638.
English abstract for DE-102008064194.
English abstract DE-102009060350.
English abstract for DE-102011106981.
German Office Action for DE-102020213148.1, dated Sep. 30, 2021.

* cited by examiner

*Primary Examiner* — Rick K Chang
(74) *Attorney, Agent, or Firm* — Fishman Stewart PLLC

(57) ABSTRACT

A method and device for mounting a plug in a hollow shaft is disclosed. The device includes a holding device for holding the plug to be mounted and a joining device for sliding the hollow shaft onto the plug held in the holding device. The holding device is radially adjustable relative to an axis of the hollow shaft to compensate for an axial offset between the axis of the hollow shaft and an axis of the plug. The joining device can be inclined to compensate for an inclined position of the axis of the hollow shaft and the axis of the plug. The method includes pressing the joining device onto the hollow shaft from above and adjusting the holding device with the plug radially to the hollow shaft if the axial (Continued)

offset is present, and inclining the joining device if the inclined position is present.

20 Claims, 2 Drawing Sheets

METHOD AND DEVICE FOR MOUNTING A PLUG IN A HOLLOW SHAFT

CROSS-REFERENCE TO RELATED APPLICATION

This application claims priority to German Application No. DE 10 2020 213 148.1 filed on Oct. 19, 2020, the contents of which are hereby incorporated by reference in its entirety.

TECHNICAL FIELD

The present invention relates to a device for mounting a plug in a hollow shaft. In addition, the invention relates to a method for mounting a plug in a hollow shaft by means of such a device.

BACKGROUND

From DE 10 2008 064 194 A1 a device for positioning at least one function element comprising a recess for a hollow shaft in a predetermined angular position on the hollow shaft is known, wherein the device comprises a receptacle intended for a function element.

From DE 10 2007 056 638 A1 a further device for mounting a composite, consisting of at least one hollow shaft carrying function elements and a housing supporting the said hollow shaft in undivided bearings is known, wherein the housing comprises positioning devices which prior to the joining hold the function elements in predetermined phase position in the housing so that the at least one hollow shaft can be inserted through the bearings of the housing and openings in the function elements. There, the positioning device is provided with recesses for the function elements which have a stop that supports the function element against the joining direction of the hollow shaft, wherein the recesses of the positioning devices have a part contour of the contour of the function elements as negative profile so that the function elements can be held in a phase position according to their future joining position. This is to make possible achieving a particularly phase-accurate positioning.

From DE 10 2009 060 350 A1 a device for mounting a hollow shaft carrying function elements is known, wherein the device comprises a machine platform, on which a plurality of positioning disks for the aligned correct positioning of the function elements is arranged in such a manner that a hollow shaft can be slid in. The positioning disks are reversibly fixed on a frame which in turn is reversibly fixed on the machine platform. By keeping multiple frames in stock, a quick change of a production process is to be made possible.

From DE 10 2011 106 981 A1 a device for producing a joined connection of at least one joining part comprising a bore with a hollow shaft is known, wherein the device comprises a joining device with a first gripper for gripping the hollow shaft and a second gripper for the position-oriented gripping of the joining part. Here, the hollow shaft is concentrically clamped at an end in a clamping means that is drive-rotatably mounted and is centred at the other end with a centring point, wherein the joining part is heated to a decided temperature and the bore expands to an oversize relative to the hollow shaft diameter. This is to create in particular a device with which a joining process can be optimised.

From EP 2 777 868 B1 a further device for positioning at least one function element comprising a hub for a hollow shaft on the hollow shaft is known.

During the pressing-in of plugs into hollow shafts, varying, in particular increased joining forces can occur because of production tolerance-related inclined positions or axial offsets between an axis of the plug and an axis of the hollow shaft, wherein in particular a so-called seizing cannot be excluded either, during which the plug because of a faulty position digs into the material of the hollow shaft. Besides damage to the plug and/or the hollow shaft, an inclined position of the plug or an axial offset between plug and hollow shaft can also have a negative effect on the radial and axial runout of the plug based on an outer diameter of the hollow shaft on the finished part which has a negative effect. Because of this, surfaces with close tolerance requirements in terms of radial and axial runout have to be elaborately machined, in particular reworked as a follow-up, i.e. after the joining of the plug in the hollow shaft, which leads to substantial additional costs.

The present invention therefore deals with the problem of stating an improved or at least an alternative embodiment for a device of the generic type which in particular overcomes the disadvantages known from the prior art.

According to the invention, this problem is solved through the subject of the independent claims. Advantageous embodiments are subject of the dependent claims.

SUMMARY

The present invention is based on the general idea of using a device for joining a plug in a hollow shaft for the first time, which is able to compensate for an axial offset between plug and hollow shaft and also an inclined position between plug and hollow shaft and because of this make possible a joining or mounting of the plug in the hollow shaft with a high radial and axial runout quality. The device according to the invention comprises a holding device for holding the plug to be mounted and a joining device for sliding the hollow shaft onto the plug held in the holding device. According to the invention, the holding device is radially adjustable relative to the axis of the hollow shaft so that in this case the plug held in the holding device is also radially adjustable relative to the axis of the hollow shaft or relative to its own axis and because of this can compensate for an axial offset between hollow shaft and plug. Compared with this, the joining device is inclinable, as a result of which an inclined position of the hollow shaft and thus an angular deviation between axis of the hollow shaft and axis of the plug can be compensated for. By means of the device according to the invention it is thus possible to compensate for both an inclined position of the axes of the hollow shaft and of the plug as well as for an axial offset and because of this achieve an extremely high joining quality. In particular, an elaborate and expensive reworking of a radial and axial runout because of close tolerance requirements that may have been necessary under certain conditions up to now can be omitted with the device according to the invention.

In an advantageous further development of the solution according to the invention, the holding device comprises a floatingly mounted plate, on which the plug to be mounted stands, wherein the plate is adjustably mounted in the radial direction relative to the hollow shaft via an air cushion or a ball bearing. Thus, when the plug is positioned in the holding device it stands on the floatingly mounted plate which is able by radial movements to compensate for an axial offset. The adjustability in the radial direction obviously amounts a few millimetres maximally and merely serves for compensating for any existing faulty positions or axial offsets between the axis of the hollow shaft and the axis of the plug prior to, or during the joining.

Practically, the holding device comprises a baseplate between which and the floatingly mounted plate the air-cushion or the ball bearing is arranged. The baseplate, the floatingly mounted plate and the balls arranged between these, or the air arranged between these thus represent the actual radial mounting and make possible compensating for any axial offset that may be present.

Practically, the holding device comprises a centring pin which engages through the baseplate and the floatingly mounted plate and centres the latter with play. Thus, the opening in the floatingly mounted plate is slightly larger in terms of its inner diameter than an outer diameter of the centring pin, so that the centring pin only roughly or generally centres the floatingly mounted plate, but allows a certain radial movement in order to be able to compensate for a possible axial offset between plug and hollow shaft. In addition to this, the centring pin has the task of again centring the floatingly mounted plate after each joining operation so that the radial movement of the same is possible in all directions during the following joining operation.

Practically, the holding device comprises a collar which encloses the ball bearing and together with the floatingly mounted plate forms a receptacle for the plug. This, such a collar forms a surrounding rim for the plug to be received in the holding device, wherein the plug is arranged with radial play in the collar and upright on the floatingly mounted plate. The collar, which in this case represents a border for the plug, thus merely serves for securely receiving the plug.

Practically, the joining device is arranged above the holding device. In the most favourable case, the holding device is thus arranged at the bottom, wherein the plug stands on the floatingly mounted plate. The hollow shaft is now substantially vertically arranged above that, so that the hollow shaft arranged above the holding device and the joining device arranged above the hollow shaft are arranged above one another. By lowering the joining device the hollow shaft is now pressed by means of the joining device onto the plug held in the holding device. By way of the inclineability of the joining device and the radial adjustability of the holding device any axial offset that may be present between hollow shaft and plug and an inclined position of the hollow shaft relative to the plug can be compensated for and because of this an extremely exact mounting of the plug in the hollow shaft achieved, which fulfils even highest requirements in terms of radial and axial runout.

Practically, the joining device is inclinable by up to 7.5°. A deviation that is greater than 7.5° need not be usually expected so that with the specified number of degrees all angles of an inclined position of the hollow shaft that occur relative to the plug can be compensated for.

The present invention, furthermore, is based on the general idea of stating a method for joining a plug in a hollow shaft by means of the device described before, in which the plug is initially arranged in the holding device. Here, the plug is arranged on the floatingly mounted plate of the holding device within the collar. Following this, the hollow shaft is positioned substantially vertically above the plug, wherein the joining device presses onto the hollow shaft from above and slides the same over the plug and at the same time in the process the holding device with the plug adjusts itself radially to the axis, if there is an axial offset between an axis of the hollow shaft and an axis of the plug and the joining device inclines, if there is an inclined position of the axes of the hollow shaft and of the plug. Here, the hollow shaft can be tied to the joining device. By means of the method according to the invention, the plug can thus be extremely accurately positioned in particular also with respect to its position and alignment in the hollow shaft, as a result of which maximum requirements in terms of axial and radial runout of the joined hollow shaft can be fulfilled without these have to be for example elaborately and cost-intensively reworked.

A joining of the hollow shaft on the plug can be for example thermally assisted in that the plug is cooled and/or the hollow shaft heated, wherein alternatively a pure press-fit is obviously also possible.

Further important features and advantages of the invention are obtained from the sub-claims, from the drawings and from the associated figure description by way of the drawings.

It is to be understood that the features mentioned above and still to be explained in the following cannot only be used in the respective combinations stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

There it shows in each case schematically.

DETAILED DESCRIPTION

Figure 1:
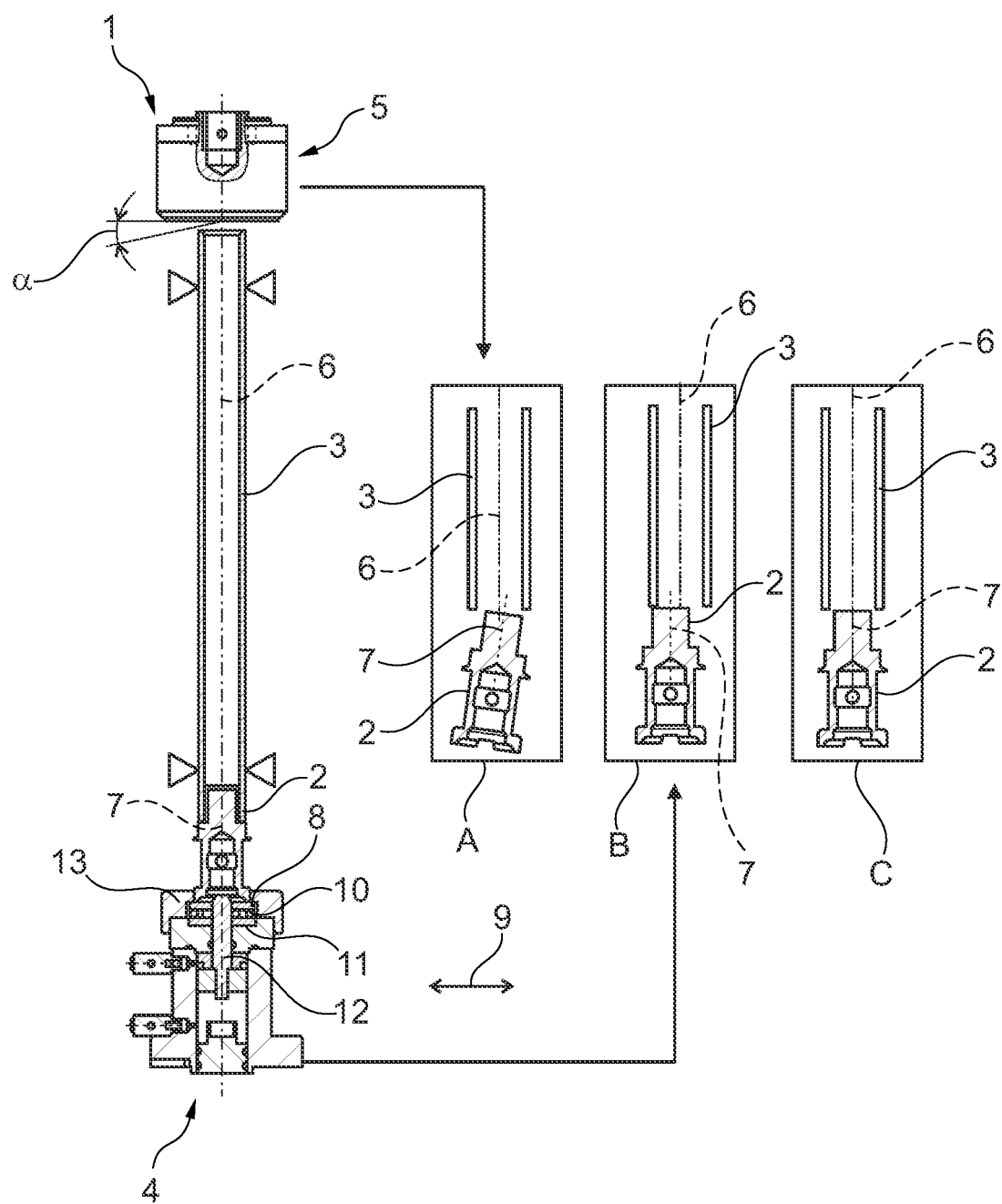
FIG. 1: a device according to the invention.
Figure 2:
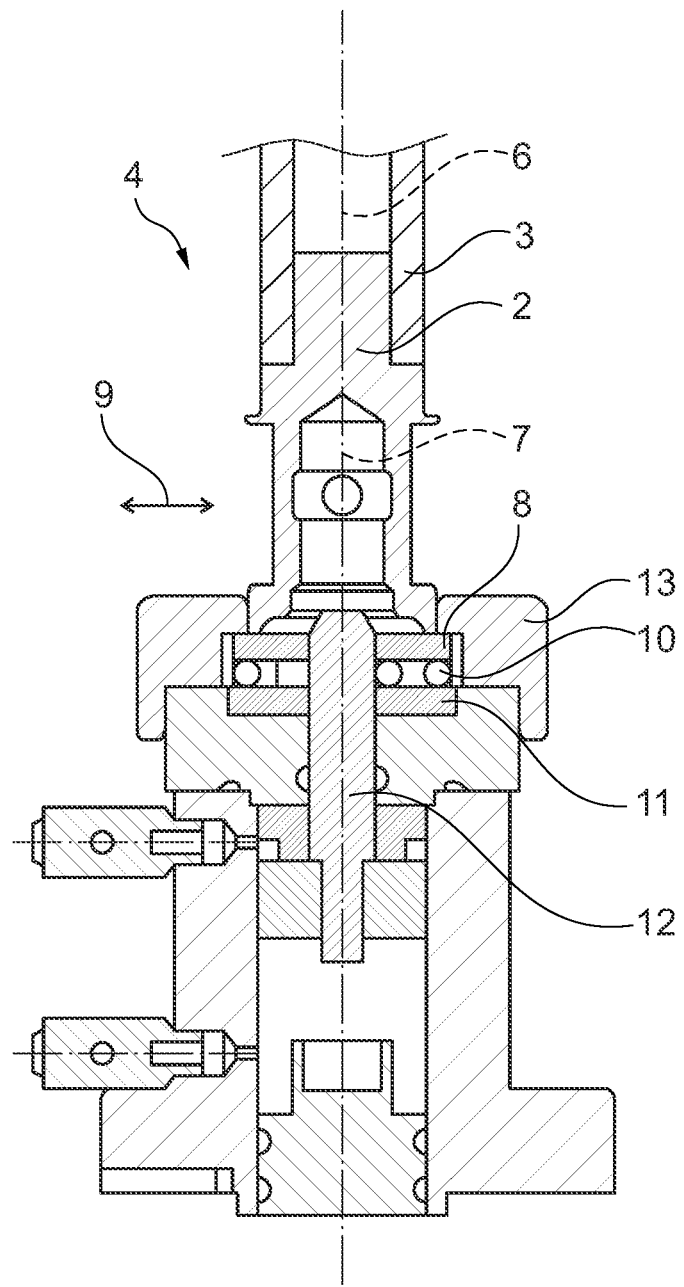
FIG. 2: a detailed representation of a holding device of the device according to the invention.

According to FIG. 1, a device 1 according to the invention for mounting a plug 2 in a hollow shaft 3 comprises a holding device 4 (see also FIG. 2) and a joining device 5. The plug 2 to be mounted is held in the holding device 4. By means of the joining device 5, the hollow shaft 3 is slid onto the plug 2. According to the invention, the holding device 4 is now radially adjustable with respect to the hollow shaft 3 in order to be able for example to compensate for an axial offset between the hollow shaft 3 and the plug 2. In addition, the joining device 5 can be tilted/inclined for example by an angle α of up to 7.5°, in order to be able to thereby compensate for an inclined position of the hollow shaft 3.

Looking for example at FIG. 1, different faulty positions between hollow shat 3 on the one hand and plug 2 on the other hand are noticeable there.

In the diagram A an axis 7 of the plug 2 for example is arranged obliquely to the axis 6 of the hollow shaft 3 which can be compensated for by the joining device 5 that can be inclined or tilted. By contrast, an axial offset is present in the diagram B between the axis 7 of the plug 2 and the axis 6 of the hollow shaft 3 so that the two axes 6, 7 in this case run parallel to one another. This can be compensated for by a radial adjustment of the holding device 4 in the radial direction 9. Shortly before the joining operation, this results in the diagram C, in which the axis 6 of the hollow shaft 3 runs coaxially to the axis 7 of the plug 2, so that there is neither an axial offset nor an inclination of the two axes 6, 7 and an optimal joining of the plug 2 in the hollow shaft 3 can take place.

By compensating for any existing faulty alignments between hollow shaft 3 and plug 2, extremely close tolerance requirements in terms of radial and axial runout can be fulfilled without the entire produced hollow shaft 3 having to be subsequently reworked in an elaborate and thus expensive manner.

Looking more closely to the holding device 4 it is noticeable that the same comprises a floatingly mounted plate 8 (see FIG. 2), on which the plug 2 to be mounted stands, wherein the plate 8 is adjustably mounted relative to the hollow shaft 3 in the radial direction 9 by way of an air cushion or in the drawn case via a ball bearing tin. In addition to this, the holding device 4 comprises a baseplate 11, between that and the floatingly mounted plate 8 the air cushion or the ball bearing tin, here the individual balls of the ball bearing tin, are arranged.

Furthermore, the holding device 4 comprises a centring pin 12 which engages through the baseplate 11 and through the floatingly mounted plate 8 and centres the latter with play. This has the major advantage that after each completed joining operation the floatingly mounted plate 8 is again aligned relative to the centring pin 12 and because of this again makes possible a radial play in all radial directions 9 during a following joining operation.

The holding device 4 additionally comprises a collar 13 which includes the ball bearing tin and the floatingly mounted plate 8 and at the same time forms a border for the plug 2 held in the holding device 4.

Generally, the joining or the sliding of the hollow shaft 3 onto the plug 2 takes place by means of the device 1 according to the invention as follows:

Initially, the plug 2 is arranged in the holding device 4, i.e. placed onto the floatingly mounted plate 8 of the same. Following this, the hollow shaft is positioned substantially vertically above the plug 2, wherein subsequently the joining device 5 presses onto the hollow shaft 3 from above, sliding the same over the plug 2. Before or during this, the holding device 4 or the floatingly mounted plate 8 and additionally the plug 2 adjust radially, i.e. in the radial direction 9, relative to the axis 6 of the hollow shaft 3 if there is an axial offset between the axis 6 of the hollow shaft 3 and the axis 7 of the plug 2. Likewise before or during the joining operation, the joining device 5 and thus the hollow shaft 3 incline, if the hollow shaft 3 is in an inclined position, re, the axes 6 and 7 are not arranged coaxially to one another, i.e. are identical. By means of the method according to the invention it is possible to align the hollow shaft 3 relative to the plug 2 or the plug 2 relative to the hollow shaft 3 so that an extremely exact joining of the plug 2 in the hollow shaft 3 with maximum requirements in terms of radial and axial runout are possible.

Here, the joining can take place by way of a press fit, i.e. the hollow shaft 3 is pressed in the cold state onto the likewise cold plug 2. Obviously, this joining operation can be additionally assisted by a thermal joining operation, for the purpose of which the plug 2 is cooled and/or the hollow shaft 3 heated.

The invention claimed is:

1. A device for mounting a plug in a hollow shaft, comprising:
    a holding device for holding the plug to be mounted,
    a joining device for sliding the hollow shaft onto the plug held in the holding device,
    wherein the holding device is radially adjustable relative to an axis of the hollow shaft to compensate for an axial offset between the axis of the hollow shaft and an axis of the plug, and
    wherein the joining device can be inclined to compensate for an inclined position of the axis of the hollow shaft and the axis of the plug, and
    wherein the holding device includes a floatingly mounted plate, on which the plug to be mounted stands.

2. The device according to claim 1, wherein the floatingly mounted plate is adjustably mounted in a radial direction relative to the hollow shaft via an air cushion or a ball bearing.

3. The device according to claim 2, wherein the holding device further includes a baseplate, between which the air cushion or the ball bearing and the floatingly mounted plate is arranged.

4. The device according to claim 3, wherein the holding device further includes a centring pin that engages through the baseplate and the floatingly mounted plate to centre the floatingly mounted plate with play.

5. The device according to claim 2, wherein the holding device further includes a collar that encloses the ball bearing and, together with the floatingly mounted plate, forms a receptacle for the plug.

6. The device according to claim 4, wherein the joining device is arranged above the holding device.

7. The device according to claim 1, wherein the joining device can be inclined by up to 7.5°.

8. A method for joining a plug in a hollow shaft via a device, comprising:
    providing a holding device for holding the plug and a joining device for sliding the hollow shaft onto the plug,
    arranging the plug in the holding device,
    positioning the hollow shaft substantially vertically above the plug,
    pressing the joining device onto the hollow shaft from above to slide the hollow shaft over the plug and adjusting the holding device with the plug radially to the hollow shaft when an axial offset is present between an axis of the hollow shaft and an axis of the plug, and
    inclining the joining device when an inclined position is present between the axis of the hollow shaft and the axis of the plug.

9. The method according to claim 8, wherein arranging the plug in the holding device includes disposing the plug on a floatingly mounted plate of the holding device that is adjustably mounted in a radial direction relative to the hollow shaft via an air cushion or a ball bearing.

10. The method according to claim 9, further comprising receiving the plug in a receptacle formed by the floatingly mounted plate and a collar of the holding device that encloses the ball bearing.

11. The method according to claim 9, wherein the joining device is inclined by up to 7.5° when the inclined position is present between the axis of the hollow shaft and the axis of the plug.

12. The device according to claim 3, wherein the holding device further includes a collar that encloses the ball bearing and, together with the floatingly mounted plate, forms a receptacle for the plug.

13. The device according to claim 4, wherein the holding device further includes a collar that encloses the ball bearing and, together with the floatingly mounted plate, forms a receptacle for the plug.

14. The device according to claim 5, wherein the joining device is arranged above the holding device.

15. The device according to claim 6, wherein the joining device can be inclined by up to 7.5°.

16. A device for mounting a plug in a hollow shaft, comprising:
   a holding device for holding the plug to be mounted;
   a joining device for sliding the hollow shaft onto the plug held in the holding device;
   wherein the holding device is radially adjustable relative to an axis of the hollow shaft to compensate for an axial offset between the axis of the hollow shaft and an axis of the plug;
   wherein the joining device can be inclined by up to 7.5° to compensate for an inclined position of the axis of the hollow shaft and the axis of the plug; and
   wherein the holding device includes a floatingly mounted plate, on which the plug to be mounted stands.

17. The device according to claim 16, wherein the floatingly mounted plate is adjustably mounted in a radial direction relative to the hollow shaft via an air cushion or a ball bearing.

18. The device according to claim 17, wherein the holding device further includes a baseplate arranged between the air cushion or the ball bearing and the floatingly mounted plate.

19. The device according to claim 18, wherein the holding device further includes a centring pin that engages through the baseplate and the floatingly mounted plate.

20. The device according to claim 19, wherein the joining device is arranged above the holding device.

* * * * *